Aug. 9, 1927.
H. A. HILLS
1,638,201
CONTINUOUS BATTERY OIL FILTER
Filed April 26, 1922 2 Sheets-Sheet 2
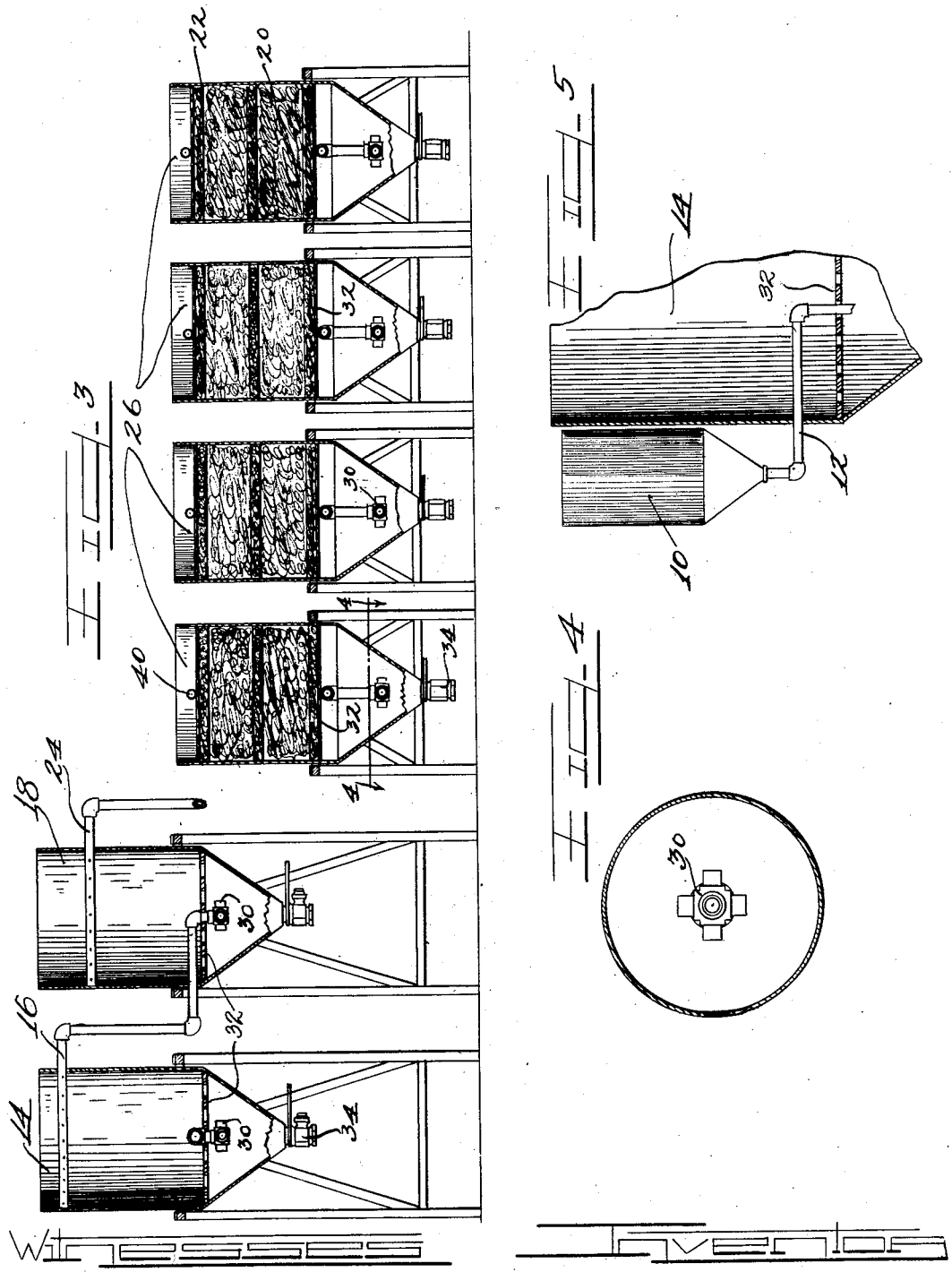

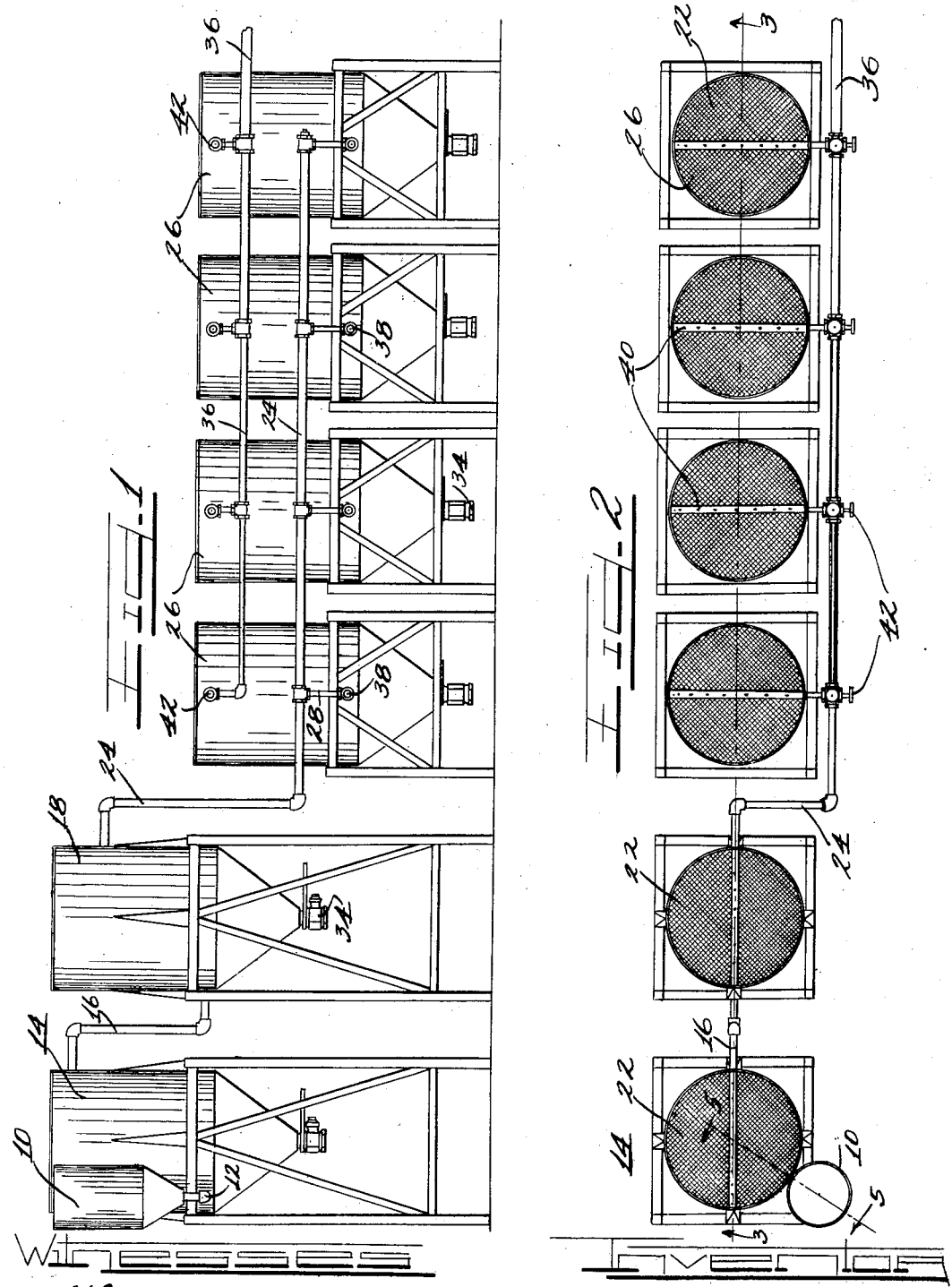

Patented Aug. 9, 1927.

1,638,201

UNITED STATES PATENT OFFICE.

HENRY A. HILLS, OF GRAND RAPIDS, MICHIGAN.

CONTINUOUS BATTERY OIL FILTER.

Application filed April 26, 1922. Serial No. 556,581.

This invention relates to improvements in oil filters and has for one of its objects the provision of an oil filter of a large and variable capacity adapted to filter or clean quantities of dirty oils such as accumulate in engines, motors or in factories, in the bottoms of oil barrels and the like, and which dirty oils can be placed into this filter battery in any amount and will issue therefrom within a comparatively short space of time completely free from refuse, sediment and dirty material.

An object of this invention is to provide a battery of oil filters which by reason of their peculiar construction and parallel connection will operate to filter a much larger volume of oil in a given space of time than would ordinarily be possible.

Another object of this invention is the provision of an oil filter adapted to be operated by gravity and one in which the flow can be readily controlled and adjusted so as to be varied according to the material and to the particular requirements of the users of the filtered oil.

Other and further important objects of the invention will be apparent from the disclosures in the drawings and accompanying specification.

The invention (in a preferred form) is illustrated in the drawings and hereinafter more fully described.

On the drawings:

Figure 1 is a front elevation of the filter showing the different elements thereof arranged in battery relation.

Figure 2 is a top plan view of the filter battery as shown in Figure 1.

Figure 3 is a vertical section taken on the line 3—3 of Figure 2.

Figure 4 is a detail view on the line 4—4 of Figure 3 showing the construction of the end of one of the delivery pipes to each filter element.

Figure 5 is a partial sectional view taken approximately on the line 5—5 of Figure 2.

As shown on the drawings:

The reference numeral 10 indicates the receiver into which the dirty oil is placed in order that it may enter the filter. A pipe 12 leads from the receiver 10 into the first filtering element 14, which is provided with a conical bottom into which the pipe 12 extends and said pipe reaches nearly to the bottom thereof. A pipe 16 leads from the top of the tank 14 over to the bottom of the next adjacent tank 18, both of the tanks 18 and 14 being provided with filtering material arranged therein in layers, as shown in Figure 3. These layers are composed of any suitable material, such as waste or the like, and the layers of waste 20 may preferably be separated by separating layers of additional filtering material 22, such as felt, which acts to more positively separate the foreign ingredients from the oil. A pipe 24 leads from the top of the tank 18, but it will be seen that the level of the pipe 24 is not quite so high as that of the pipe 16, so that a gravity flow is maintained from the tank 14 to the tank 18 and out of the same. From the tank 18 the pipe 24 leads to the battery of filtering elements which may be composed of any number of elements 26, as shown in Figure 1. The pipe 24 extends clear across all the filtering elements 26 and is provided with a series of inlet pipes 28 leading off therefrom, one for each of the small filters 26. Each of the connecting pipes, as shown in the drawings, which terminates in the conical lower portion of each of the filtering elements, is open on all sides in the form of a cross having four laterally and radially directed openings, one at each arm thereof, as best shown in Figure 4.

The lower or conical portion of any of the filtering elements, such as 14, 18 or 26, is not packed with filtering material and the oil is free to enter therein and rise upwardly, finally contacting with a perforated plate 32 placed across the top of the conical portion and which supports the layers of filtering material 20 and 22 in position. Each filtering element is provided with such a perforating plate 32. A discharge plug or valve 34 is provided at the lowermost portion of each of the conical bottoms of the filtering element so that sediment or refuse may be drained therefrom as convenient. A delivery or overflow pipe 36 for the purified oil leads from the battery or filtering elements 26 and may extend to any convenient storage tank or the like, from which the filtered oil is delivered as desired. Valves 38 and 42 are provided for each of the filtering elements 26 so that all or any number of them may be used as desired, the remainder being cut out by merely closing said valves. The pipes 40, from which the purified oil is taken from the top of each or any of the filtering elements, are perforated as shown in the drawings so as to additionally exclude any foreign material, and this line of perforations also provides for the more thorough draining off of the purified oil from all portions of the filtering elements, these pipes extending completely across the top of each filtering element and preferably upon a diameter of the same.

The operation is as follows:

A quantity of dirty oil is placed into the tank 10, care being taken that it is filled to the top thereof so that a gravity circulation will positively be maintained. This flows down through the pipe 12 into the conical bottom of the tank 14, at the top of which cone is positioned the perforated plate 32 as described. Supported by the perforated plate 32 are the alternate layers of filtering material 20 and 22 composed of waste, felt or the like through which the material gradually filters, the dirt and refuse and other sediment collecting in the bottom of the tank and being drawn off occasionally by means of the plug or valve 34. The outlet of the pipe 12 is provided with the four sided opening or cross-shaped delivery pipe 30, as shown in Figure 4, so that the oil may be sure to issue therefrom with equal pressure on all sides. The oil, after having seeped upwardly through the filtering material 20 and 22, enters the pipe 16 by means of the perforations therein, such entrance of the oil occurring all along the line of the pipe through the perforations above described. From the pipe 16 the oil, partially purified, flows to the tank 18, the end of the pipe 16 being also provided with a cross-shaped outlet 30 as in the tank 14. The outlet pipe 24 is also positioned at a lower level so that a gravity flow of the oil or other fluid will be maintained. From the pipe 24 the oil, now more thoroughly purified, is delivered to the battery of filters 26 and by means of the valves 38 and 42 may be allowed to enter and flow through any or all of them as desired. It is obvious that the combination of such a filtering means provides a large surface of filtering material for the same quantity of liquid and will therefore allow a larger volume to flow through the filters in a shorter length of time than would be possible with only one filtering element. It is further obvious that the number of filtering elements 26 may be increased or diminished as desired according to the needs of the plant, and that any number of them may be cut out of circulation for cleaning purposes or the like.

I am aware that numerous details of construction may be varied through a wide range without departing from the principles of this invention, and I therefore do not purpose limiting the patent granted otherwise than necessitated by the prior art.

I claim as my invention:

A continuous oil filter, comprising a receiver for dirty oil, a plurality of filtering chambers connected to said receiver in series and having therein filtering means consisting of filter plates only for the purposes of catching heavy particles of dirt, and a battery of filtering chambers connected in parallel to the last of said first-mentioned chambers and having therein filter plates and filtering material above the plates, each of said chambers having a lower conical portion and each thereof having an inlet pipe extending therein and provided with a vertical portion depending axially of the chamber in its conical portion and below its filter plate and terminating in a discharge head having a series of radially outstanding discharge arms.

In testimony whereof I have hereunto subscribed my name.

HENRY A. HILLS.